US009782835B2

(12) United States Patent
Short et al.

(10) Patent No.: US 9,782,835 B2
(45) Date of Patent: Oct. 10, 2017

(54) TOOL ATTACHMENT AND THROUGH SPINDLE COOLANT SYSTEMS FOR USE WITH ULTRASONIC MACHINING MODULES

(71) Applicant: Edison Welding Institute, Inc., Columbus, OH (US)

(72) Inventors: Matthew A. Short, Wilmington, OH (US); Jacob Hay, Circleville, OH (US)

(73) Assignee: Edison Industrial Innovation, LLC, Bowling Green, KY (US)

( * ) Notice: Subject to any disclaimer, the term of this patent is extended or adjusted under 35 U.S.C. 154(b) by 0 days.

(21) Appl. No.: 14/845,719

(22) Filed: Sep. 4, 2015

(65) Prior Publication Data
US 2016/0067790 A1 Mar. 10, 2016

Related U.S. Application Data

(63) Continuation-in-part of application No. 14/998,003, filed on Sep. 5, 2014, now abandoned, which is a
(Continued)

(51) Int. Cl.
*B23B 37/00* (2006.01)
*B23B 31/30* (2006.01)
(Continued)

(52) U.S. Cl.
CPC ............. *B23B 37/00* (2013.01); *B23B 31/02* (2013.01); *B23B 31/08* (2013.01); *B23B 31/20* (2013.01);
(Continued)

(58) Field of Classification Search
CPC ... B23B 37/00; B23B 2240/28; B23B 29/125; B23B 2250/16; B23B 2270/10;
(Continued)

(56) References Cited

U.S. PATENT DOCUMENTS 3,466,970 A * 9/1969 Jones .................... B23B 29/125
408/241 R
4,423,880 A 1/1984 Kosmowski
(Continued)

FOREIGN PATENT DOCUMENTS

DE WO 2006056316 A1 * 6/2006 ............. B23B 37/00
JP 05208349 A * 8/1993
(Continued)

OTHER PUBLICATIONS

Machine translation, WIPO document, WO2009101987A1, "Cutting/Grinding Device", Ohnishi, K., Aug. 2009.*
(Continued)

*Primary Examiner* — Daniel Howell
*Assistant Examiner* — Chwen-Wei Su

(57) ABSTRACT

An ultrasonic machining module that includes an ultrasonic transducer, wherein the ultrasonic transducer is adapted to receive a machining tool and a vibration-isolating housing adapted to be both compatible with a machining system and to receive the ultrasonic transducer therein, wherein the housing further includes at least one modification for isolating all vibrations generated by the ultrasonic transducer when the device is in operation except axial vibrations transmitted to the machining tool, thereby preventing unwanted vibrations from traveling backward or upward into the machining system. The ultrasonic machining module may also include an acoustically tuned collet and/or an acoustically tuned system for delivering coolant fluid through the module to a machining tool or target substrate.

4 Claims, 9 Drawing Sheets

Related U.S. Application Data continuation-in-part of application No. 13/046,099, filed on Mar. 11, 2011, now Pat. No. 8,870,500.

(60) Provisional application No. 61/312,738, filed on Mar. 11, 2010.

(51) Int. Cl.
*B23B 31/02* (2006.01)
*B23B 31/08* (2006.01)
*B23B 31/20* (2006.01)
*B23Q 11/10* (2006.01)

(52) U.S. Cl.
CPC ........ *B23B 31/305* (2013.01); *B23B 2231/24* (2013.01); *B23B 2250/16* (2013.01); *B23B 2260/108* (2013.01); *B23B 2270/10* (2013.01); *B23Q 11/1023* (2013.01); *Y10S 408/70* (2013.01); *Y10T 408/23* (2015.01)

(58) Field of Classification Search
CPC .......... B23B 2270/56; B23B 2260/108; B23B 31/20; B23B 31/305; B23B 2231/24; B23Q 1/0009; H02N 2/103; H01L 41/09; A61C 17/20; Y10S 408/70; Y10T 408/23; Y10T 409/309408; Y10T 409/30952; B06B 1/00; B06B 1/02; A61B 17/320068
USPC ............ 310/323.18, 323.12, 323.01, 323.02, 310/323.03, 323.16, 323.19
See application file for complete search history.

(56) References Cited

U.S. PATENT DOCUMENTS

| | | | |
|---|---|---|---|
| 6,204,592 B1 * | 3/2001 | Hur | A61B 17/1624 310/323.12 |
| 6,905,294 B2 * | 6/2005 | Sugata | B23Q 11/1046 408/58 |
| 2005/0275170 A1 * | 12/2005 | Haenle | B23B 31/028 279/20 |
| 2006/0128283 A1 | 6/2006 | Fiebelkorn et al. | |
| 2006/0229132 A1 * | 10/2006 | Sander | B23B 37/00 464/51 |
| 2008/0277886 A1 | 11/2008 | Peter | |
| 2011/0155407 A1 | 6/2011 | Yang et al. | |
| 2011/0170964 A1 * | 7/2011 | Rabate | B23B 29/125 408/17 |
| 2011/0175300 A1 * | 7/2011 | Schuffenhauer | B23B 31/305 279/4.06 |
| 2011/0222975 A1 | 9/2011 | Short | |
| 2012/0107062 A1 * | 5/2012 | Moraru | B23B 29/125 408/17 |
| 2013/0028675 A1 | 1/2013 | Vogler et al. | |

FOREIGN PATENT DOCUMENTS

| | | | |
|---|---|---|---|
| JP | 2002219606 A | * | 8/2002 |
| JP | WO 2009101987 A1 | * | 8/2009 |

OTHER PUBLICATIONS

Machine translation, WIPO document, WO 2006056316A1, "Tool holder device machine tool with a tool holder device and drilling method in particular for drilling deep holes.", Neugebauer et al., Jun. 2006.*

* cited by examiner

TOOL ATTACHMENT AND THROUGH SPINDLE COOLANT SYSTEMS FOR USE WITH ULTRASONIC MACHINING MODULES

CROSS-REFERENCE TO RELATED APPLICATIONS

This patent application is a continuation-in-part of U.S. patent application Ser. No. 14/998,003 filed on Sep. 5, 2014 and entitled "Ultrasonic Machining Module: Tool Attachment and Through-Spindle Coolant", which was originally filed as U.S. Patent Application 62/046,365 and subsequently converted to U.S. patent application Ser. No. 14/998,003. U.S. patent application Ser. No. 14/998,003 is a continuation-in-part of U.S. patent application Ser. No. 13/046,099 filed on Mar. 11, 2011 and entitled "Ultrasonic Machining Module", now U.S. Pat. No. 8,870,500, which claimed the benefit of U.S. Patent Application Ser. No. 61/312,738 filed on Mar. 11, 2010 and entitled "Accessory Module for Applying Ultrasonic Energy to Machining Tools". The disclosures of all of these previously filed applications are incorporated by reference herein in their entirety and made part of the present patent application for all purposes.

BACKGROUND OF THE INVENTION

The described invention relates generally to systems for machining metals and other materials and more specifically to a system for machining metals and other materials into which an ultrasonic machining module has been incorporated, wherein the ultrasonic machining module is compatible with a variety of existing machining systems, devices, and processes due to its vibration-isolating characteristics.

Machining, which is a collective term for drilling, milling, reaming, tapping, and turning, is an enabling technology that impacts virtually all aspects of manufacturing in the United States and elsewhere in the world. In a specific example, a milling machine is a machining tool used to machine solid materials. Milling machines are typically classified as either horizontal or vertical, which refers to the orientation of the main spindle. Both types range in size from small, bench-mounted devices to much larger machines suitable for industrial purposes. Unlike a drill press, which holds the workpiece stationary as the drill moves axially to penetrate the material, milling machines move the workpiece axially and radially against the rotating milling cutter, which cuts on its sides as well as its tip. Milling machines are used to perform a vast number of operations, from simple tasks (e.g., slot and keyway cutting, planing, drilling) to complex tasks (e.g., contouring, diesinking).

Cutting and drilling tools and accessories used with machining systems (including milling machines) are often referred to in the aggregate as "tooling". Milling machines often use CAT or HSK tooling. CAT tooling, sometimes called V-Flange tooling, is the oldest and probably most common type used in the United States. CAT tooling was invented by Caterpillar Inc. of Peoria, Ill., to standardize the tooling used on Caterpillar machinery. HSK tooling, sometimes called "hollow shank tooling", is much more common in Europe where it was invented than it is in the United States. The holding mechanism for HSK tooling is placed within the hollow body of the tool and, as spindle speed increases, it expands, gripping the tool more tightly with increasing spindle speed.

Improving the machinability of certain materials is of significant interest to manufacturers of military equipment and certain commercial hardware, as well as to the builders of machine tools. More specifically, very advanced materials such as armor plates and composites are notoriously difficult to machine with standard systems and methods. High-speed systems and ultra-hard tool bits are used for such material, but provide only a marginal increase in tool life and productivity. Significant improvements in the machinability of materials have been achieved by implementing advanced technologies such as laser, waterjet, and EDM cutting. However, these processes are high in capital cost, limited in application, and differ too much to be used in standard machine shops. Also, the application of these processes is limited to certain types of cuts in the materials on which they are typically used.

Ultrasonic-assisted machining was developed in the United States in the 1950's and was used for machining materials that were considered to be difficult to machine at the time. The more modern process of ultrasonic machining (UM) involves the application of high power ultrasonic vibrations to "traditional" machining processes (e.g., drilling, turning, milling) for improving overall performance in terms of faster drilling, effective drilling of hard materials, increased tool life, and increased accuracy. This is typically accomplished by using drill bits manufactured from high speed steel (HSS), carbide, cobalt, polycrystalline diamond composite, or other suitable materials affixed to a collet (e.g., shrink fit, compression, hydraulic, or mechanical) that is affixed to an ultrasonic (US) transmission line. In this context, UM is not the existing ultrasonic-based slurry drilling process (i.e., impact machining) used for cutting extremely hard materials such as glass, ceramics, quartz. Rather, this type of UM concerns methods for applying high power ultrasonics to drills, mills, reamers, taps, turning tools, and other tools that are used with modern machining systems.

Although the use of ultrasonics with modern machining systems provides significant and numerous benefits, there are certain technical challenges involved, not the least of which is the incorporation of ultrasonic energy into machining systems that were not originally designed to accommodate this type of energy output. Thus, there is an ongoing need for an ultrasonic machining module that is compatible with and that may be incorporated into existing machining systems without damaging or negatively impacting the performance of such systems.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first device for use in a machining system is provided. This device includes an ultrasonic transducer having a known acoustic frequency, wherein the ultrasonic transducer further includes: a front mass; a back mass; a plurality of piezoelectric ceramics positioned between the front mass and the back mass; at least one source of electricity connected to the piezoelectric ceramics; a compression member passing through the front mass, back mass, and ceramics, wherein the compression member is operative to apply compressive force to the ceramics; and a collet adapted to receive a machining tool; and a vibration-isolating housing adapted to be both compatible with a machining system and to receive the ultrasonic transducer therein, wherein the housing further includes at least one modification for isolating all vibrations generated by the ultrasonic transducer when the device is in operation except axial vibrations transmitted to the machining tool, thereby preventing unwanted vibration from traveling backward or upward into the machining system.

In accordance with another aspect of the present invention, a second device for use in a machining system is provided. This device also includes an ultrasonic transducer having a known acoustic frequency, wherein the ultrasonic transducer further includes: a front mass; a back mass; a plurality of piezoelectric ceramics positioned between the front mass and the back mass; at least one source of electricity connected to the piezoelectric ceramics; a compression member passing through the front mass, back mass, and ceramics, wherein the compression member is operative to apply compressive force to the ceramics; and a collet adapted to receive a machining tool; and a vibration-isolating housing adapted to be both compatible with a machining system and to receive the ultrasonic transducer therein, wherein the housing further includes at least one modification for isolating all vibrations generated by the ultrasonic transducer when the device is in operation except axial vibrations transmitted to the machining tool, thereby preventing unwanted vibration from traveling backward or upward into the machining system. The collet is tuned to the acoustic frequency of the ultrasonic transducer and further includes a chamber formed therein; a sleeve mounted with the chamber, wherein the sleeve is adapted to receive the machining tool; at least one port for introducing fluid into the chamber around the sleeve; and at least one hydraulic plunger for pressurizing the chamber around the sleeve and compressing the sleeve around the machining tool for securing the machining tool therein. Alternately, the collet may include a chamber formed therein; a compressible sleeve mounted with the chamber, wherein the compressible sleeve is adapted to receive the machining tool; and at least one compression member for applying compressive force to the compressible sleeve for securing the machining tool therein.

In yet another aspect of this invention, a third device for use in a machining system is provided. This device includes an ultrasonic transducer having a known acoustic frequency, wherein the ultrasonic transducer further includes: a front mass; a back mass; a plurality of piezoelectric ceramics positioned between the front mass and the back mass; at least one source of electricity connected to the piezoelectric ceramics; a compression member passing through the front mass, back mass, and ceramics, wherein the compression member is operative to apply compressive force to the ceramics; and a collet adapted to receive a machining tool; a vibration-isolating housing adapted to be both compatible with a machining system and to receive the ultrasonic transducer therein, wherein the housing further includes at least one modification for isolating all vibrations generated by the ultrasonic transducer when the device is in operation except axial vibrations transmitted to the machining tool, thereby preventing unwanted vibration from traveling backward or upward into the machining system; and a system for delivering coolant fluid to the machining tool, wherein the fluid delivery system is tuned to the frequency of the ultrasonic transducer and further includes a fluid channel formed lengthwise in the compression member; an isolation adapter positioned on the uppermost end of the compression member and aligned therewith, wherein the isolation adapter further includes a fluid channel formed lengthwise therein; and a plurality of O-rings positioned circumferentially around the isolation adapter.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Exemplary embodiments of the present invention are now described with reference to the Figures. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

Figure 1:
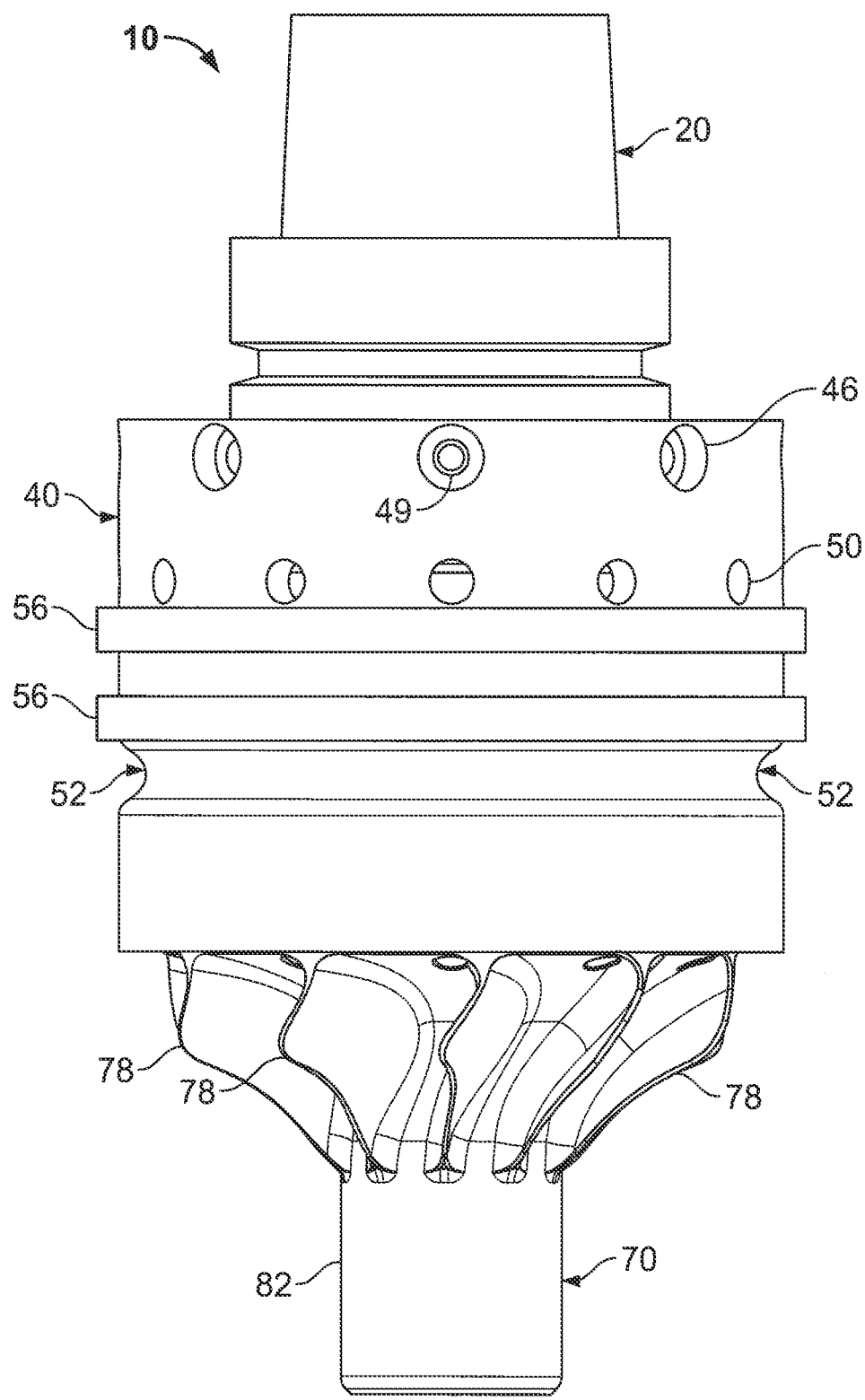
FIG. 1 is a side view of an ultrasonic machining module in accordance with a first exemplary embodiment of the present invention.
Figure 2:
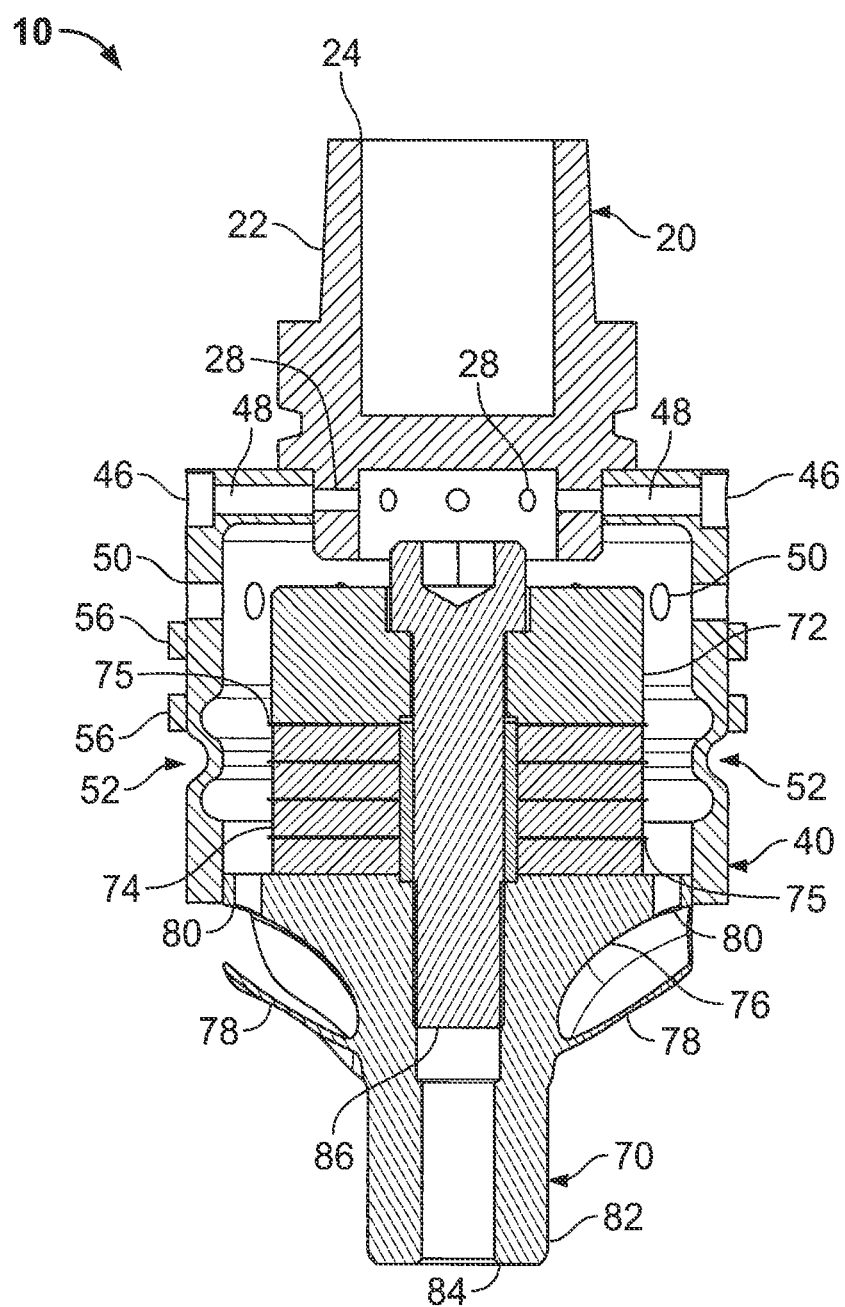
FIG. 2 is a cross-sectional view of the ultrasonic machining module of FIG. 1.

The present invention provides various ultrasonic machining modules that have been adapted for incorporation into existing commercially available machining systems that were not originally designed to accommodate such ultrasonic modules. With reference to FIGS. 1-2, a first exemplary embodiment of the present invention provides an ultrasonic machining module for use in a machining system, wherein the ultrasonic machining module includes: (a) an ultrasonic transducer, wherein the ultrasonic transducer is adapted to receive a tool bit, and wherein the ultrasonic transducer further comprises: (i) a front mass; (ii) a back mass; (iii) a plurality of piezoelectric ceramics positioned between the front mass and back mass; (iv) at least one electrical connector; and (v) a bolt passing through the front mass, back mass, and ceramics, wherein the bolt is operative to apply compressive force to the ceramics; and (b) a vibration-isolating housing adapted to be both compatible with a machining system and to receive the ultrasonic transducer therein. The housing further includes a spring-like feature formed radially therein above the front mass, wherein the spring-like feature further includes a curved and thinned section of the housing, and wherein the curved and thinned section of the housing is operative to permit flexion in the housing for isolating all vibrations generated by the ultrasonic transducer when the device is in operation except axial vibrations transmitted to the tool bit, thereby preventing unwanted vibrations from traveling backward or upward into the machining system and potentially causing damage to the system or other problems. This particular embodiment is disclosed in U.S. patent application Ser. No. 13/046,099 (now U.S. Pat. No. 8,870,500), which is expressly incorporated by reference herein in its entirety, for all purposes.

With reference to FIGS. 1-2, an exemplary embodiment of ultrasonic machining module 10 includes three basic components: tool holder 20, housing 40, and ultrasonic transducer assembly 70. Tool holder 20 includes upper portion 22, which further includes primary bore 24 formed therein for attaching machining module 10 to the main spindle (e.g., CAT 40, 60 or HSK) of a machining system (not shown). Lower portion 26 of tool holder 20 includes a plurality of secondary bores 28 that cooperate with similar structures in housing 40 to mechanically couple tool holder 20 to housing 40 using connectors 49 (i.e., centering bolts). In some embodiments of the present invention, tool holder 20 is shrink-fit to housing 20 in addition to or instead of being bolted thereto.

Housing 40 includes a rigid cylindrical body 42 that further includes a centrally located aperture 44 that is adapted to receive tool holder 20, and a bottom opening 54, into which ultrasonic transducer assembly 70 is inserted. Circumferential electrical contacts 56 (i.e., slip rings) are positioned on the exterior of housing 40. As will be appreciated by the skilled artisan, the use of other types of electrical contacts is possible with this invention. For example, a single contact 56 may be utilized or the contacts may extend through the spindle of the machining system, while still providing or maintaining the flow of cooling air through the spindle. The top or upper portion of housing 40 includes a plurality of apertures 46 that connect to a plurality of bores 48 that correspond to the placement of bores 28 in tool holder 20 when machining module 10 is assembled. A series of connectors 49 are inserted into bores 48 and 28 for the purpose of bolting tool holder 20 to housing 40. A plurality of air outlets 50 is formed in housing 20. As described in greater detail below, air outlets 50 cooperate with specific structures on ultrasonic transducer assembly 70 to cool machining module 10 when in use, thereby reducing or eliminating the need for any separate or external system or apparatus for cooling piezoelectric ceramics 74.

Housing 40 also includes circumferential region 52, which acts as a vibration isolating spring, and as such is characterized as a "spring-like structure". In the exemplary embodiment, region 52 includes a contoured and thinned section of the material from which housing 40 is manufactured. When machining module 10 is in use, region 52 permits a degree of flexion in housing 40, thereby absorbing and/or isolating acoustic energy generated by ultrasonic transducer assembly 70 and preventing unwanted vibration from traveling backward or upward into the spindle or other mechanical components of the machining system. Axial vibration generated by ultrasonic transducer assembly 70 is not diminished by region 52; therefore, torque is still delivered to the tool bit or other item that is attached to front mass 76 and that is being used to machine a workpiece. Within the context of this invention, the term "tool bit" should be understood to mean drill bit or any other item that is attached to front mass 76. Essentially, region 52 is operative to absorb and/or isolate most or all vibrational modes except the axial vibrations directed toward the workpiece.

Ultrasonic transducer assembly 70 includes back mass 72, front mass 76, and a plurality of piezoelectric ceramics 74 positioned between these two structures. A plurality of electrodes 75 are sandwiched between piezoelectric ceramics 74, and bolt 86 passes through back mass 72, ceramics 74, electrodes 75 and a portion of front mass 76. When tightened, bolt 86 is operative to apply compressive force to piezoelectric ceramics 74. Although not shown in the Figures, a series of electrical lead wires are typically attached to at least one of the electrodes 75. These wires exit the interior of housing 40 either through housing 40 or through tool holder 20 where they then connect to circumferential electrical contacts 56. Brush contacts or other types of electrical contacts may be used to provide electricity to machining module 10. Transducer assembly 70 typically operates at power levels ranging from 1 kW-5 kW and amplitudes ranging from 25 µm to 150 µm.

In the exemplary embodiment of ultrasonic machining module 10 shown in FIGS. 1-2, ultrasonic transducer assembly 70 further includes a plurality of cooling members, fins or vanes 78 that are located circumferentially around front mass 76 just beneath a plurality of air inlets 80 that are also formed in front mass 76. When ultrasonic machining module 10 rotates, vanes 78, which simulate a compressor wheel, are operative to draw air upward and through air inlets 80. Air then flows through the interior of housing 40 across ceramics 74 for cooling purposes, and exits housing 40 though air outlets 50. As shown in the Figures, the front or bottom area of front mass 76 includes a tapered collet 82 that further includes bore 84, which is adapted to receive a drill bit, milling tool, or other item. As will be appreciated by the skilled artisan, a drill bit or other item (not shown) may be attached to collet 82 using the process known as shrink-fitting. By heating the mass around bore 84 uniformly, it is possible to significantly expand the diameter of the bore. The shaft of a drill bit or other item is then inserted into the expanded bore. Upon cooling, the mass around the bore shrinks back to its original diameter and frictional forces create a highly effective joint. In an exemplary embodiment, the bottom edge of housing 40 is attached to the top portion of front mass 76 using a shrink-fit process for facilitating removal of case 40 for repairing ultrasonic machining module 10. As will be appreciated by the skilled artisan, other means of attaching tooling items to front mass 76 and/or attaching housing 40 to transducer assembly 70 are possible and are compatible with the present invention.

Some or all of the metal components of ultrasonic machining module 10 are typically manufactured from A2 tool steel. Alternately, D2, SS, 4140, and/or 350-M tool steel may be used. Regardless of the material used, front mass 76 and back mass 72 may both be manufactured from the same material as a means for reducing amplitude. In general terms, mixing of the mass of these components adjusts amplitude. In the exemplary embodiment shown in FIGS. 1-2, total module length is about 7.5 inches (19.1 cm). However, the present invention is scalable and miniaturized variants of ultrasonic machining module 10 are compatible with medical and surgical systems and devices, among other applications.

Figure 3:
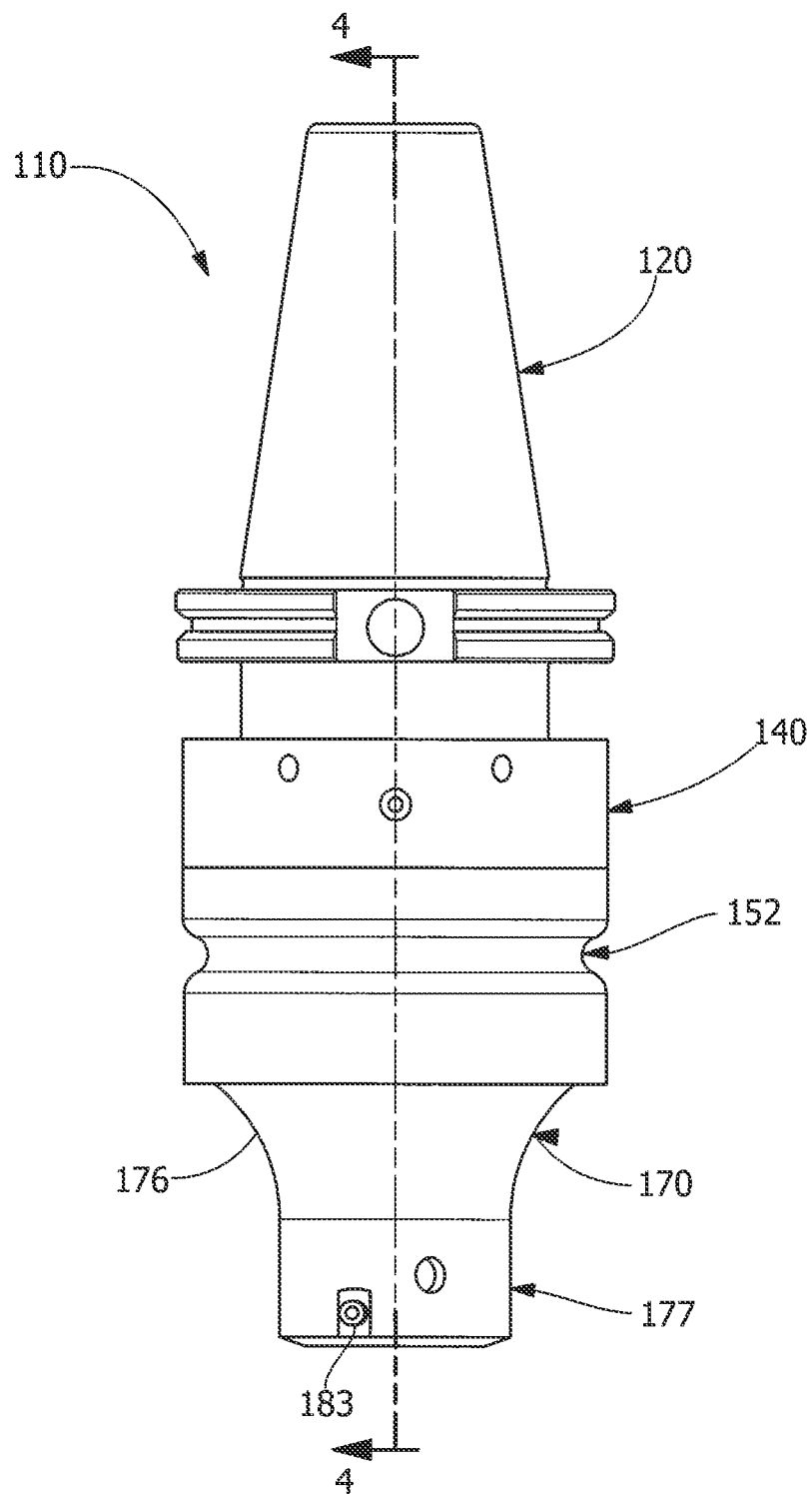
FIG. 3 is a side view of an ultrasonic machining module in accordance with a second exemplary embodiment of the present invention, wherein a hydraulic collet is included as a component of the ultrasonic machining module.
Figure 4:
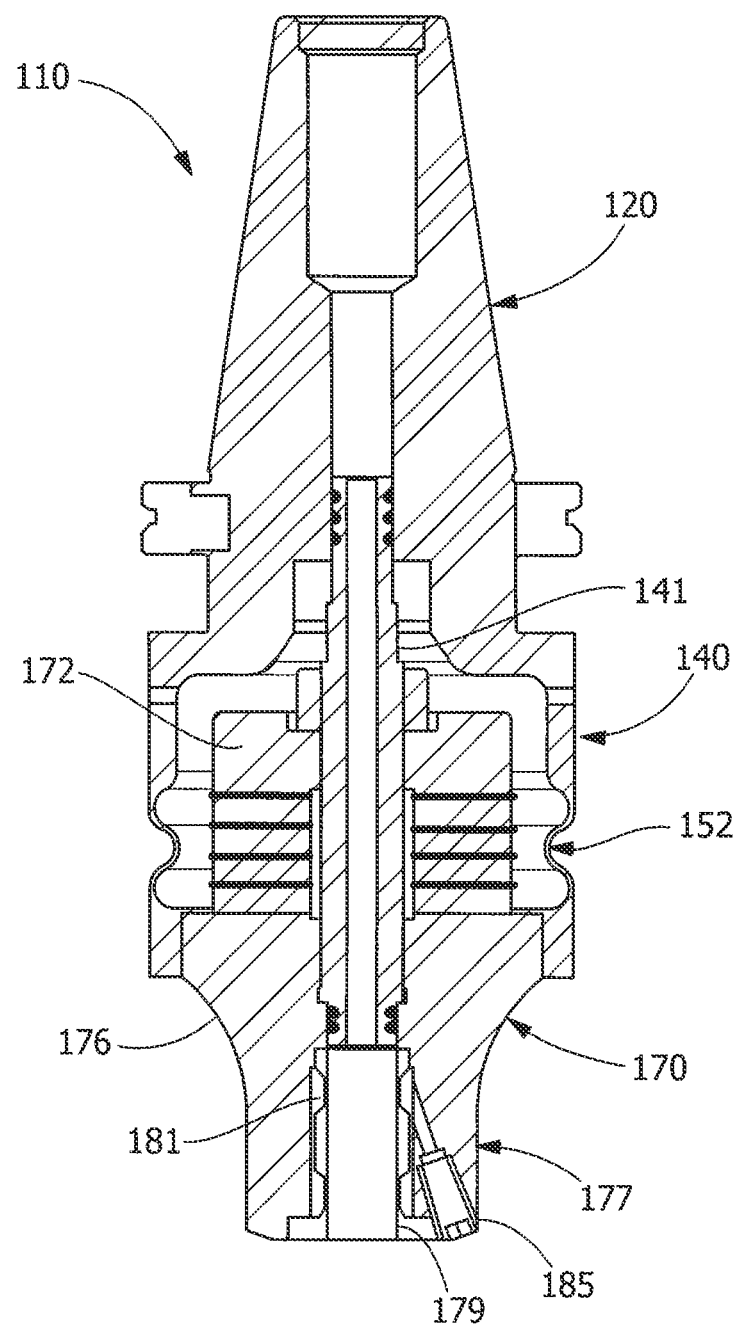
FIG. 4 is a cross-sectional view of the ultrasonic machining module of FIG. 3.

FIG. 3-4 provide side and cross-sectional views respectively of ultrasonic machining module 110 in accordance with a second exemplary embodiment of the present invention, wherein hydraulic collet 177 is included as a component of ultrasonic machining module 110. In this embodiment, ultrasonic machining module 110 includes tool holder 120, housing 140, compression stud 141, vibration isolating region 152, ultrasonic transducer assembly 170, back mass 172, front mass (collet body) 176, hydraulic collet 177, sleeve 179, pressurized chamber 181, fill ports 183, hydraulic plungers 185, and threaded region 187. Unlike conventional hydraulic collet systems, the physical body of hydraulic collet 177 is configured to be an acoustical device. Accordingly, the front mass or collet body 176 is tuned to $\lambda/4$. Within collet body 176, there is a secondary sleeve 179 which may be attached using threaded surfaces or brazing processes. A preferred process includes brazing sleeve 179 within body 176 to couple these components for effectively transmitting the acoustic wave. In order for ultrasonic machining module 110 to resonate properly, various design aspects are relevant. First, front mass (collet body) 176 is sufficiently rigid to support the internal pressure generated by hydraulic plungers 185 so that all deformation is produced within sleeve 179. Second, oil or grease is used as the pressurized media and there is less than 10% air within pressurized chamber 181. Third, there is a minimum of three pressure/fill ports 183 located symmetrically around the body of front mass (collet body) 176. This is one of the most important aspects, as this design feature can change the mass around the circumference of front mass (collet body) 176, which will then drive non-uniform displacement. For example, if there is only one fill port 183, there is a reduction in mass in pressurized chamber 181, thus reducing the amount of displacement compared to surrounding areas. This in turn introduces a bending motion which is then transmitted to the tip of a tool mounted within ultrasonic machining module 110. This has the same effect if only two fill ports 183 are used; therefore three fill ports 183 are important for properly pressuring or filling pressured chamber 181 with media to create uniform displacement. If a threaded sleeve 179 is used in this embodiment, sleeve geometry is typically symmetrical and any additional fill ports 183 are also symmetrical in their placement. The threaded sleeve embodiment utilizes a floating sleeve 179 which is then shifted by a secondary nut (not shown in Figures) which is used to push sleeve 179 onto front mass (collet body) 176. This in turn creates a volumetric change, thereby generating pressure on the surrounding sleeve 179 acting as a bore body. Fourth, a minimum pressure of 250 psi is generated in order to rigidly couple a cutting tool through deformation of the wall of sleeve 179. This effectively transmits the required torque and exerts the necessary machining forces. Furthermore, coupling drives an attached tool in resonance with ultrasonic transducer assembly 110.

Figure 5:
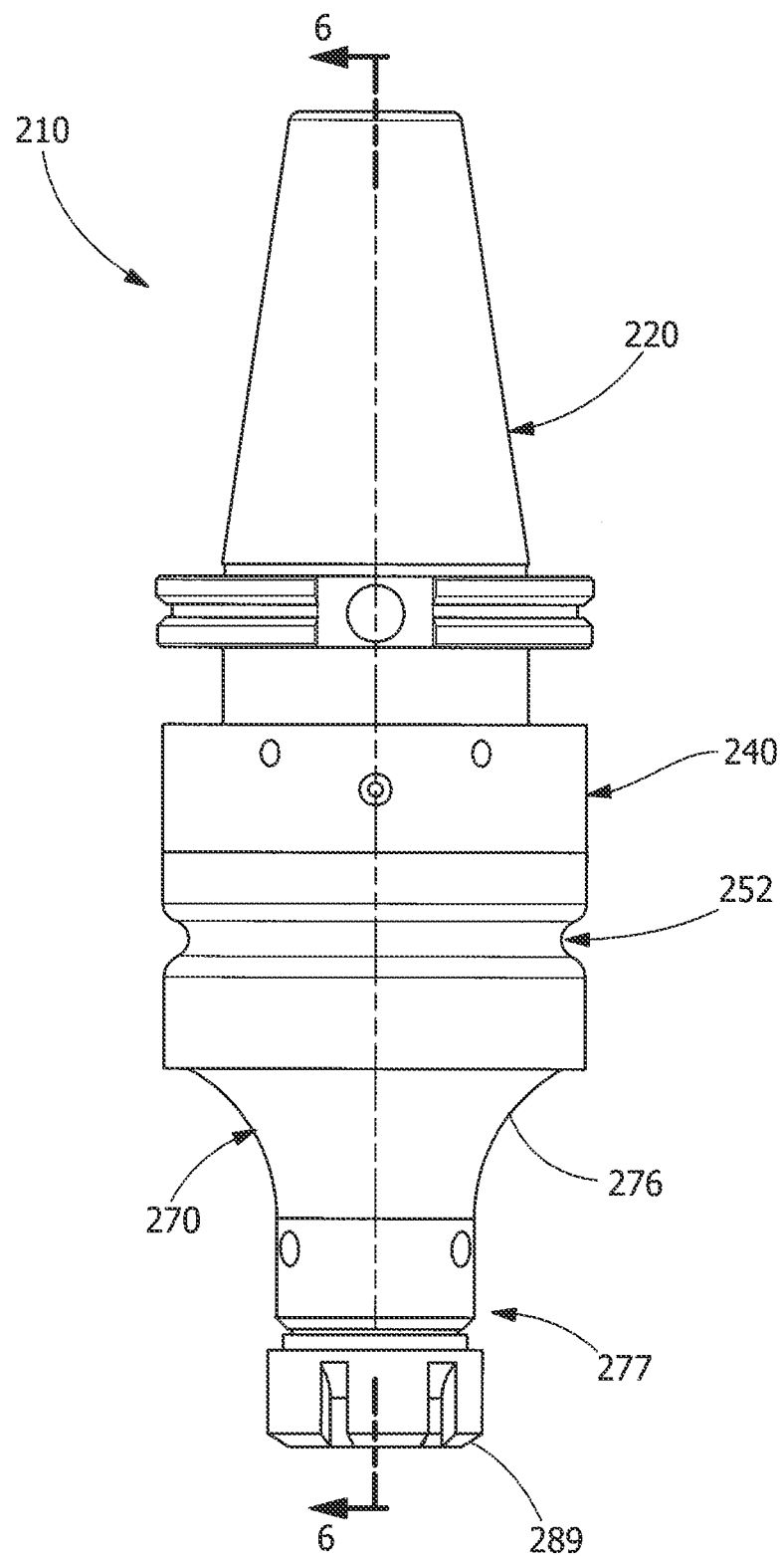
FIG. 5 is a side view of an ultrasonic machining module in accordance with a third exemplary embodiment of the present invention, wherein a nut acts upon a compressible sleeve that is included as a component of the ultrasonic machining module.
Figure 6:
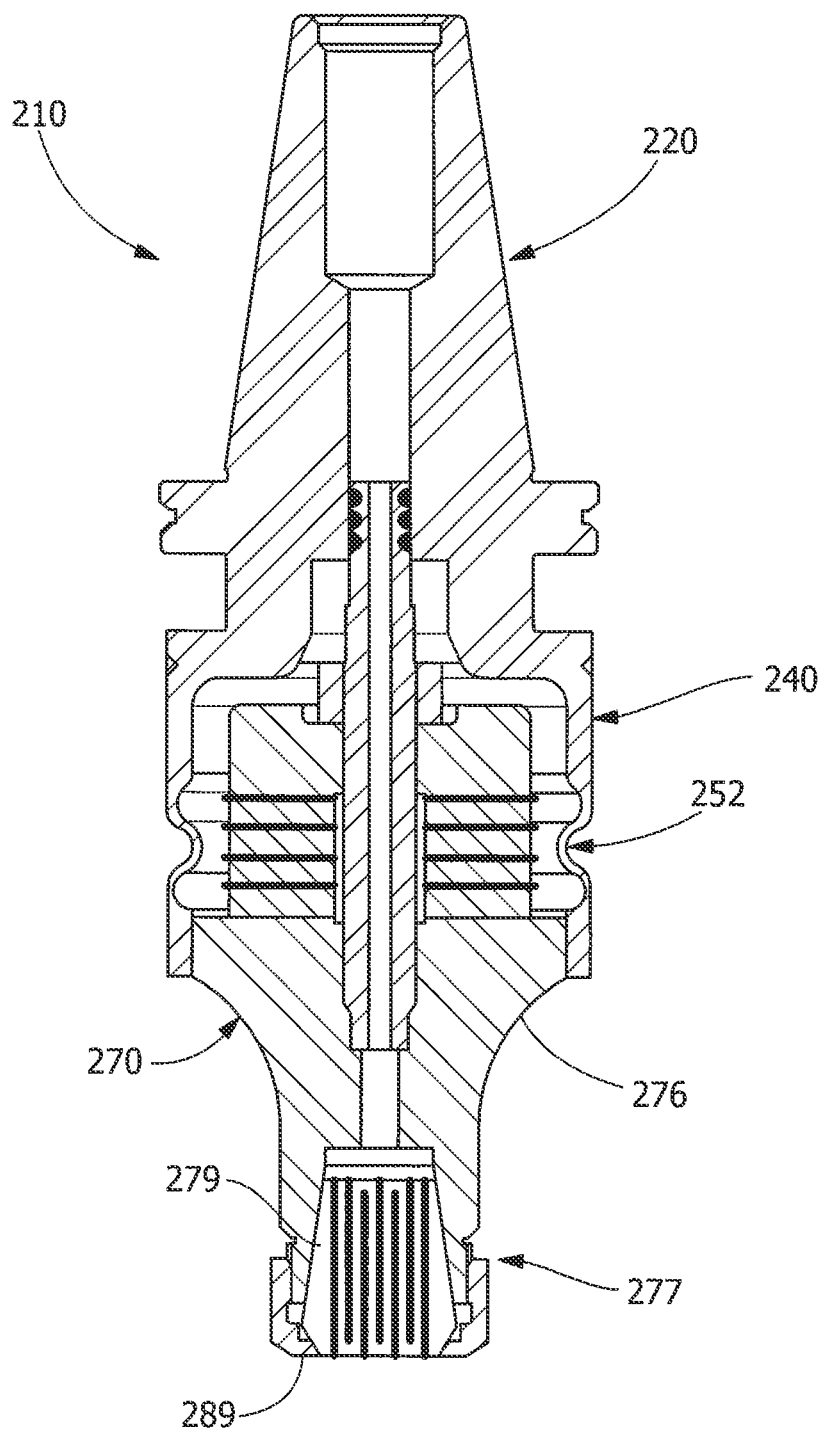
FIG. 6 is a cross-sectional view of the ultrasonic machining module of FIG. 5.

FIGS. 5-6 provide side and cross-sectional views respectively of ultrasonic machining module 210 in accordance with a third exemplary embodiment of the present invention, wherein a compressible sleeve 279 is included as a component of ultrasonic machining module 210. In this embodiment, ultrasonic machining module 210 includes tool holder 220, housing 240, compression stud 241, vibration isolating region 252, ultrasonic transducer assembly 270, back mass 272, front mass (collet body) 276, compressible sleeve 279, and threaded body (nut) 289. This embodiment provides an additional tool attachment option by using compressible sleeve 279, which is integrated with transducer front mass (collet body) 276. Compressible sleeve 279, which is flexible, is mechanically compressed by threaded body or nut 289, which reduces the internal diameter of compressible sleeve 279 for effectively holding the shank of a machining tool disposed therein and effectively coupling with front mass (collet body) 276. With regard to this embodiment: (i) compressible sleeve 279 has no more than 45% of its mass reduced by specific geometry that allows compressible sleeve 279 to change its diameter under compressive force; (ii) the angle used to compress compressible sleeve 279 is at least 1° but no more than 20°; (iii) the angle of compressible sleeve 279 and the angled surface within tuned $\lambda/4$ front mass/collet maintains line contact throughout the entire length of engagement (ring or other contact will not appropriately couple the components to transfer acoustic waves); (iv) the body compressing compressible sleeve 279 can be a nut, arrangement of screws, Dzus fastener, or cam (a mechanic clamping action is utilized); and (v) collet 277 typically accommodates tool shank diameters ranging from $1/16"$ to 1.5", although the use of other diameters is possible.

Figure 7:
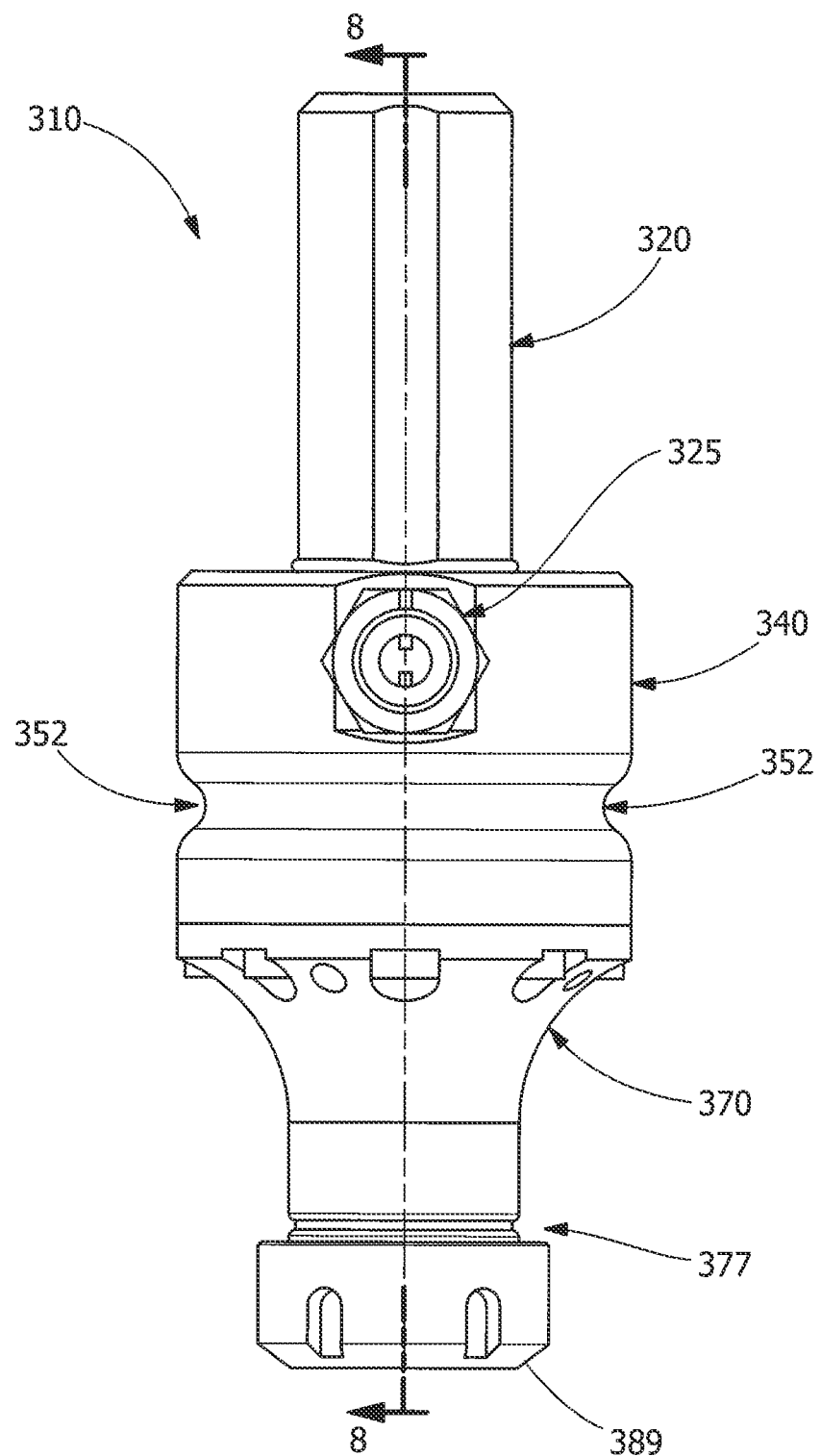
FIG. 7 is a side view of an ultrasonic machining module in accordance with a fourth exemplary embodiment of the present invention, wherein the through spindle coolant system included in the ultrasonic machining module includes an isolation adapter.
Figure 8:
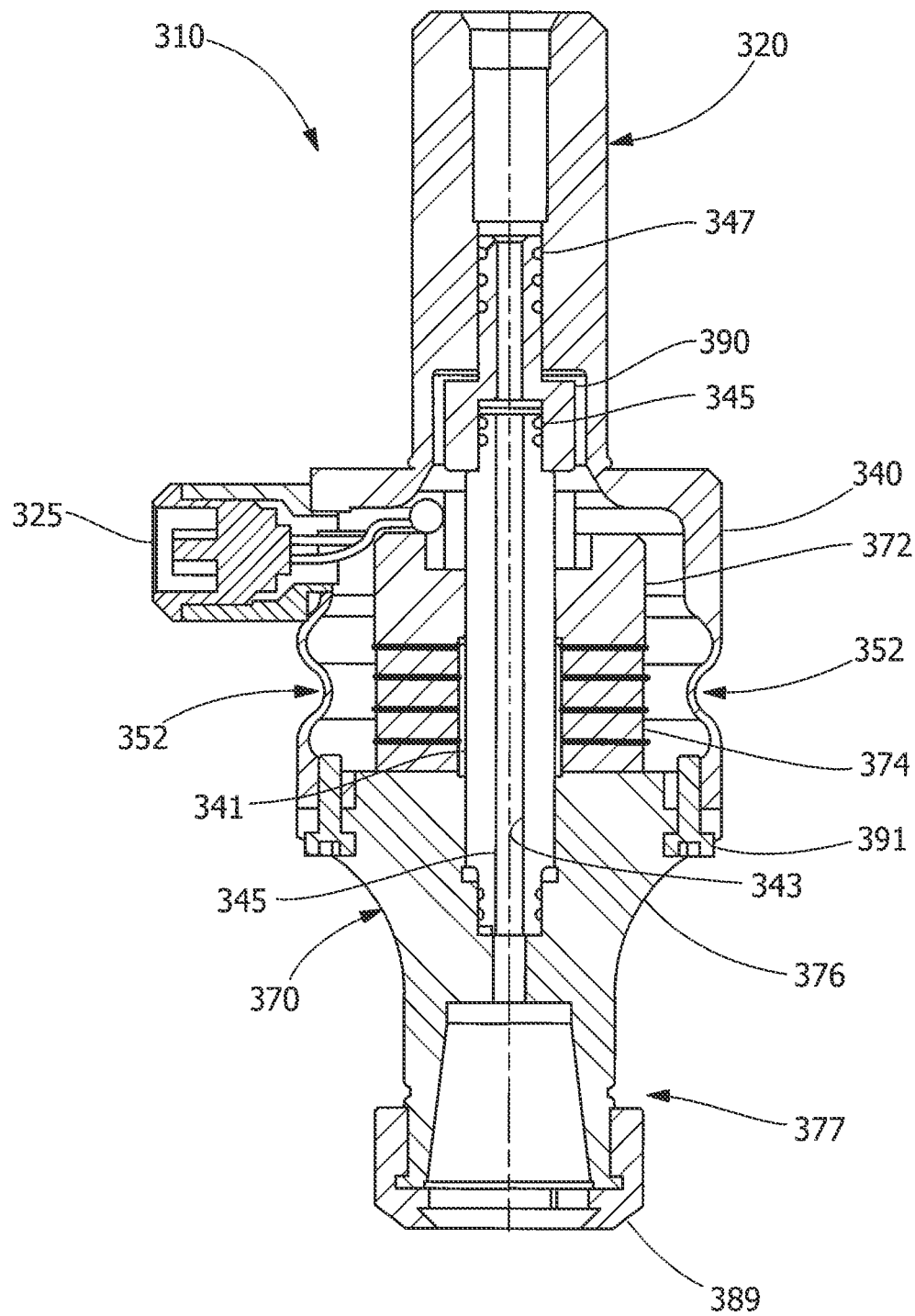
FIG. 8 is a cross-sectional view of the ultrasonic machining module of FIG. 7.
Figure 9:
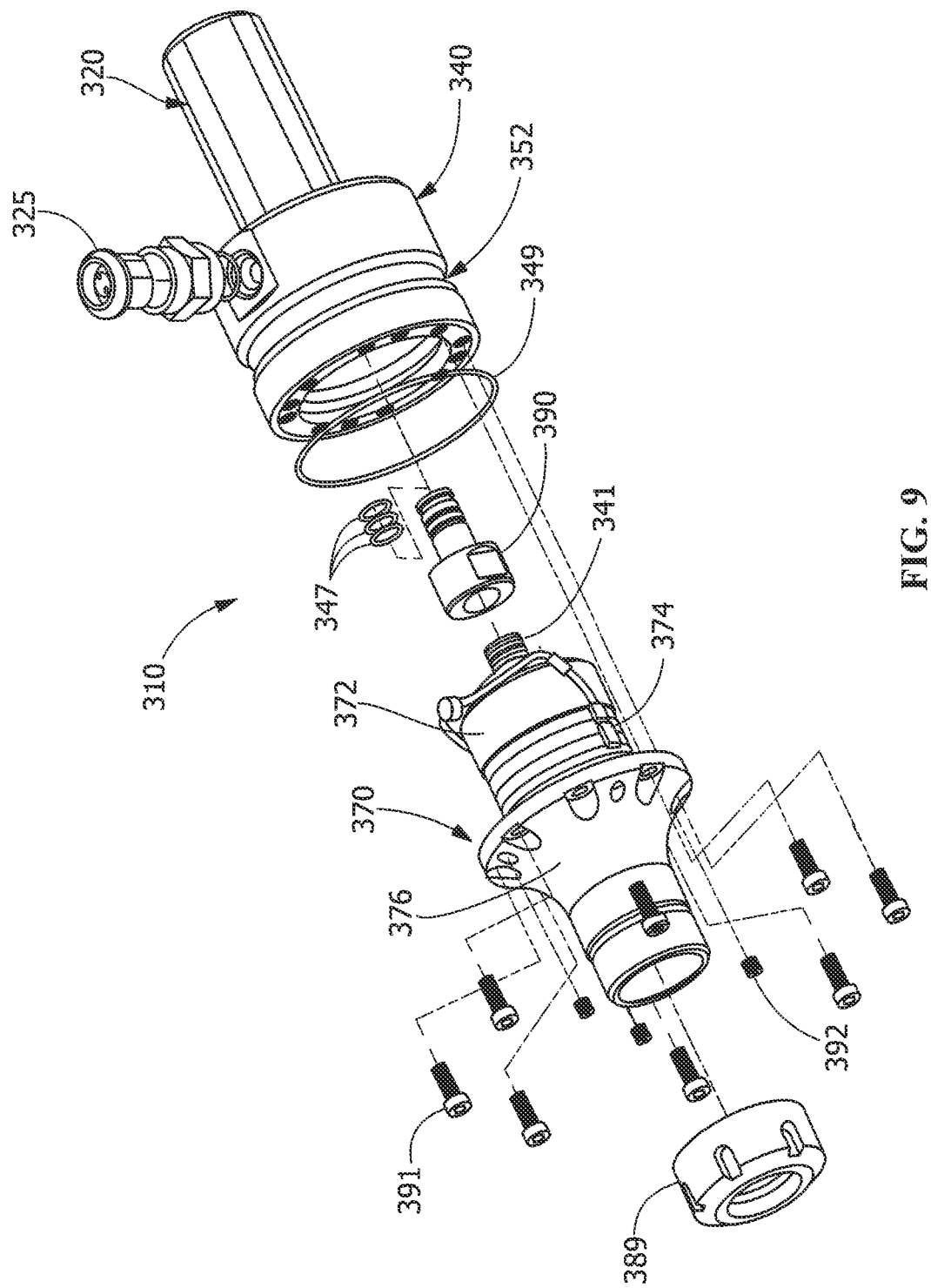
FIG. 9 is an exploded, perspective view of the ultrasonic machining module of FIG. 7.

FIGS. 7-9 provide side, cross-sectional, and perspective views respectively of ultrasonic machining module 310 in accordance with a fourth exemplary embodiment of the present invention, that includes through-spindle coolant features as components of ultrasonic machining module 310. In this embodiment, the through spindle coolant features operate while under ultrasonic excitation and provide passages and sealing for high pressure coolant to be delivered to a machining tool attached to ultrasonic machining module 310 and/or to a target substrate. In this embodiment, ultrasonic machining module 310 includes tool holder 320, electrical connector 325, housing 340, compression stud 341, vibration isolating region 352, ultrasonic transducer assembly 370, collet 377, nut 389, and isolation adapter 390.

As best shown in FIGS. 7-8, the conventional manner of employing a high-strength bolt or compression stud for applying appropriate preload forces to transducer ceramics 374 has been modified such that compression stud 341 now functions as a tuned component of ultrasonic transducer assembly 370. Conventional compression studs/bolts are attached to the nodal region of a transducer front mass and for application of compressive forces against a transducer back mass and typically there is no need for an extension of the compression stud. In this embodiment, compression stud 341 extends much further up the system and into the cavity of tool holder 320, (which may be CAT, HSK, BT, etc.) so that seals can be incorporated into the ultrasonic machining module 310 for sealing off high pressure coolants being introduced to ultrasonic transducer assembly 370 due to transmission of electrical current through the module. In this configuration, compressive stud 341 is designed to act as a tuned element based on the total system frequency and is driven in a pure longitudinal mode because a bending mode would create interference with the side walls of tool holder 320 and create a potential leak path for coolant fluid. In this embodiment, fluid channel 343, which passes through compression stud 341, is not larger than one-quarter inch operating at up to 1000 psi in order to suppress cavitation generated by ultrasonic transducer assembly 370, which may lead to cavitation erosion. Both ends of compression stud 341 are adapted to receive seals that protect the electrical components of ultrasonic transducer assembly 370.

An important aspect of this embodiment is the integration of isolation adapter 390 onto the rear or uppermost end of compression stud 341. As with other embodiments of this invention, ultrasonic transducer assembly 370 utilizes λ/2 (half wave length) construction. Therefore, the nodal region of ultrasonic transducer assembly 370 resides at the upper most face of front mass 376, wherein the driving elements are affixed and set in compression. This, in turn, locates the anti-nodes at the furthermost end of ultrasonic transducer assembly 370. This is specifically located at the end of front mass 376 (position of threads) and the upper most end of compression stud 341. Accordingly, because the uppermost end of compression stud 341 is part of the anti-node of ultrasonic transducer assembly 370, this structure is also set into resonance and has the highest degree of displacement. For this reason, the length of compression stud 341 is an important design aspect for facilitating fluid passage or flow through a body action in tension, while delivering acceptable stress levels of 4-8 ksi to the driving elements of ultrasonic machining module 310. Variations in the length of compression stud 341 directly impacts resonant frequency and displacement at both anti-nodes.

Just as the opposing anti-node (tool attachment location) on ultrasonic transducer assembly 370 is affected by increases/decreases in mass with respect to resonant frequency, the uppermost end of compression stud 341 is also affected by mass changes, but can also be put into secondary modes induced by excessive side loads or constraints induced by alignment issues between the uppermost end of compression stud 341 and tool holder 320. This possibility is eliminated through the use of elastomeric seals or O-rings 347, which allows isolation adapter 390 to "float" within the tool holder 320 component of housing 340. For preventing leakage of coolant fluid, compression stud 341 and isolation adapter 390 are sealed within ultrasonic transducer assembly 370 using a series of O-rings 345 and 347, respectively, while O-ring 349 seals the upper portion of ultrasonic transducer assembly 370 to the lower portion thereof. A series of attachment fasteners and alignment members 391 and 392 respectively, hold the main (upper and lower) components of ultrasonic transducer assembly 370 together. Electricity is supplied to ultrasonic transducer assembly 370 though electrical connector 325 and nut 389 provides compressive force for mounting a machining tool in collet 377. Other tool attachment systems and devices are compatible with this embodiment.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. A device for use in a machining system, comprising:
 (a) an ultrasonic transducer having a known acoustic frequency, wherein the ultrasonic transducer further includes:
  (i) a front mass;
  (ii) a back mass;
  (iii) a plurality of piezoelectric ceramics positioned between the front mass and the back mass;
  (iv) at least one source of electricity connected to the piezoelectric ceramics;
  (v) a compression member passing through the front mass, back mass, and ceramics, wherein the compression member is operative to apply compressive force to the ceramics; and
  (vi) a collet adapted to receive a machining tool, wherein the collet is tuned to the acoustic frequency of the ultrasonic transducer and further includes:
   a) a chamber formed therein;
   b) a compressible sleeve mounted with the chamber, wherein the compressible sleeve is adapted to receive the machining tool; and
   c) at least one compression member for applying compressive force to the compressible sleeve for securing the machining tool therein; and
  (vii) at least one electrical connector; and
 (b) a vibration-isolating housing adapted to be both compatible with a machining system and to receive the ultrasonic transducer therein, wherein the housing further includes at least one modification for isolating all vibrations generated by the ultrasonic transducer when the device is in operation except axial vibrations transmitted to the machining tool, thereby preventing unwanted vibration from traveling backward or upward into the machining system, and wherein the at least one modification for isolating all vibrations generated by the ultrasonic transducer further includes a spring-like feature formed radially in the housing above the front mass, wherein the spring-like feature further includes a curved and thinned section of the housing, and wherein the curved and thinned section of the housing is operative to permit flexion in the housing for isolating all vibrations generated by the ultrasonic transducer when the device is in operation except axial vibrations transmitted to the machining tool;
 (c) a tool holder, wherein the tool holder and the top portion of the housing are mechanically coupled to one another or are integrated with one another; and
 (d) an acoustically tuned system for delivering coolant fluid to the machining tool, wherein the acoustically tuned fluid delivery system further comprises:
  (i) a fluid channel formed lengthwise in the compression member;
  (ii) an isolation adapter positioned on the uppermost end of the compression member and aligned therewith, wherein the isolation adapter further includes a fluid channel formed lengthwise therein; and
  (iii) a plurality of O-rings positioned circumferentially around the isolation adapter.

2. A device for use in a machining system, comprising:
 (a) an ultrasonic transducer having a known acoustic frequency, wherein the ultrasonic transducer further includes:
  (i) a front mass;
  (ii) a back mass;
  (iii) a plurality of piezoelectric ceramics positioned between the front mass and the back mass;
  (iv) at least one source of electricity connected to the piezoelectric ceramics;
  (v) a compression member passing through the front mass, back mass, and ceramics, wherein the compression member is operative to apply compressive force to the ceramics; and
  (vi) a collet adapted to receive a machining tool; and (b) a vibration-isolating housing adapted to be both compatible with a machining system and to receive the ultrasonic transducer therein, wherein the housing further includes at least one modification for isolating all vibrations generated by the ultrasonic transducer when the device is in operation except axial vibrations transmitted to the machining tool, thereby preventing unwanted vibration from traveling backward or upward into the machining system, and wherein the at least one modification for isolating all vibrations generated by the ultrasonic transducer further includes a spring-like feature formed radially in the housing above the front mass, wherein the spring-like feature further includes a curved and thinned section of the housing, and wherein the curved and thinned section of the housing is operative to permit flexion in the housing for isolating all vibrations generated by the ultrasonic transducer when the device is in operation except axial vibrations transmitted to the machining tool; and
(c) a system for delivering coolant fluid to the machining tool, wherein the fluid delivery system is tuned to the frequency of the ultrasonic transducer and further includes:
 (i) a fluid channel formed lengthwise in the compression member;
 (ii) an isolation adapter positioned on the uppermost end of the compression member and aligned therewith, wherein the isolation adapter further includes a fluid channel formed lengthwise therein; and
 (iii) a plurality of O-rings positioned circumferentially around the isolation adapter.

3. The device of claim 2, wherein the collet is tuned to the acoustic frequency of the ultrasonic transducer and further includes:
 (a) a chamber formed therein;
 (b) a sleeve mounted with the chamber, wherein the sleeve is adapted to receive the machining tool;
 (c) at least one port for introducing fluid into the chamber around the sleeve; and
 (d) at least one hydraulic plunger for pressurizing the chamber around the sleeve and compressing the sleeve around the machining tool for securing the machining tool therein.

4. The device of claim 2, wherein the collet is tuned to the acoustic frequency of the ultrasonic transducer and further includes:
 (a) a chamber formed therein;
 (b) a compressible sleeve mounted with the chamber, wherein the compressible sleeve is adapted to receive the machining tool; and
 (c) at least one compression member for applying compressive force to the compressible sleeve for securing the machining tool therein.

\* \* \* \* \*